(12) United States Patent
Rivas

(10) Patent No.: US 6,299,672 B1
(45) Date of Patent: Oct. 9, 2001

(54) SUBSURFACE INTEGRATED PRODUCTION SYSTEMS

(75) Inventor: Olegario Rivas, Bartlesville, OK (US)

(73) Assignee: Camco International, Inc., Houston, TX (US)

( * ) Notice: Subject to any disclaimer, the term of this patent is extended or adjusted under 35 U.S.C. 154(b) by 0 days.

(21) Appl. No.: 09/419,224

(22) Filed: Oct. 15, 1999

(51) Int. Cl.[7] .................................................. B01D 19/00
(52) U.S. Cl. .............................. 95/243; 95/253; 96/156; 96/183; 96/207; 96/215; 166/75.12; 166/105.5
(58) Field of Search ............................ 95/243, 241, 253, 95/248; 96/155, 156, 181, 182, 183, 184, 207, 215; 166/75.12, 105.5, 105.6

(56) References Cited

U.S. PATENT DOCUMENTS

| | | | |
|---|---|---|---|
| 879,728 | * 2/1908 | Brown | 96/185 |
| 1,269,134 | * 6/1918 | Trumble | 96/185 |
| 1,468,193 | * 9/1923 | Carter | 96/183 |
| 2,588,296 | * 3/1952 | Russell, Jr. | 166/75.12 |
| 2,750,000 | * 6/1956 | Williams et al. | 95/253 |
| 2,773,556 | * 12/1956 | Meyers et al. | 96/185 |
| 2,865,470 | * 12/1958 | Sochor | 95/248 |
| 2,875,831 | * 3/1959 | Martin et al. | 96/183 |
| 3,208,201 | * 9/1965 | Oliver, III | 96/185 |
| 3,578,077 | * 5/1971 | Glenn, Jr. et al. | 166/75.12 |
| 3,704,567 | * 12/1972 | Engel | 96/183 |
| 3,802,501 | 4/1974 | Mecusker | 166/75 |
| 3,982,589 | * 9/1976 | Wilson et al. | 166/75.12 |
| 4,159,036 | * 6/1979 | Wilson et al. | 166/75.12 |
| 4,417,907 | * 11/1983 | Fontenot | 95/243 |
| 4,824,447 | * 4/1989 | Goldsberry | 96/185 |
| 4,948,393 | * 8/1990 | Hodson et al. | 95/253 |
| 4,968,332 | * 11/1990 | Maher | 96/183 |
| 6,132,494 | * 10/2000 | Kjos et al. | 95/243 |

FOREIGN PATENT DOCUMENTS

| | | | |
|---|---|---|---|
| 2 081 598 | 2/1982 | (GB) | B01D/19/00 |
| 2 318 306 | 4/1998 | (GB) | B01D/17/025 |
| WO 87/04137 | 7/1987 | (WO) | B65G/5/00 |
| WO 92/19352 | 11/1992 | (WO) | B01D/17/038 |

OTHER PUBLICATIONS

L.E. Gomez et al., entitled: "Enhanced Mechanistic Model and Field Application Design Of Gas–Liquid Cylindrical Cyclone Separators", SPE 49174, pp. 1–12, 1998.

* cited by examiner

Primary Examiner—Duane S. Smith
(74) Attorney, Agent, or Firm—Fletcher, Yoder & Van Someren

(57) ABSTRACT

A technique is described for producing fluids from a series of wells. Production fluids from production wells are raised from the wells and deposited in a separation unit. The production fluids typically include both liquid and gas phase components. The separation unit utilizes a plurality of separation stages to separate the gas and liquid phase components in the production fluids.

33 Claims, 3 Drawing Sheets

SUBSURFACE INTEGRATED PRODUCTION SYSTEMS

FIELD OF THE INVENTION

The present invention relates generally to systems for producing fluids such as oil and gas from geological formations via subterranean wells. More particularly, the invention relates to a technique for producing flowable materials by extracting fluids from one or more wells and depositing the fluids in a gathering or collection facility where the fluids may separate into gas and liquid components for conveyance to a collection or processing point.

BACKGROUND OF THE INVENTION

A wide range of completion techniques have been devised and are presently in use for producing useful flowable substances, such as oil and gas, from subterranean deposits. In production wells having sufficient natural pressure to force the fluids to a collection point, typically at the earth's surface, the wells may be exploited directly without artificial pumping means. Where, however, the well pressures are insufficient for this purpose, various types of pumps are employed to raise the fluids to the earth's surface. These pumps may be located at least partially below the earth's surface, with pumping elements or rods extending to the location of the fluid. However, in many applications, it is preferable to use a submersible pumping system deployed in the well and driven electrically to displace the wellbore fluids under pressure sufficient to convey them to the collection or processing point.

In many pumping systems used to extract petroleum and similar products from production wells, the production rate may be hampered by the presence of fluids of lesser interest, or by elevations through which the fluids must be raised. Specifically, in many petroleum wells, liquid phase components of wellbore fluids are mixed or disbursed with gaseous phase components. Separators may be employed to at least partially extract the gaseous phase components for production of the petroleum, or the liquid and gas may be allowed to separate over time via gravity, where the dispersion permits. However, such techniques may not always present the most economical solution from the point of view of actual production rates. Accordingly, wellbore fluids may be raised to the earth's surface and stored in a gathering station, typically an above-ground container, where gas-phase components are allowed to slowly migrate from the liquid-phase components.

While such collection stations are generally effective for separating the wellbore fluid components from one another, they are not without drawbacks. For example, depending on the well production volume and collection schedules, the collection stations may occupy significant space. Also, such collection stations are not generally permitted or desirable in environmentally sensitive areas, near residential areas, and so forth.

In addition to problems associated with separation of wellbore fluid components, production from groups of wells having mixed gas and liquid components is often limited by the hydraulic head required to raise the fluids to the collection point. Specifically, because the production rate of fluid typically declines as the hydraulic head increases, a collection point at a substantially raised position with respect to the wellhead can result in poor production rates. This is particularly problematic in wells that are located some distance from the collecting station, and in sub-sea wells from which production fluids must be raised to an elevated production vessel or a platform, or to a distant collection point.

Several concepts have been used to separate gas-phase from liquid-phase components in production fluids with sub-sea facilities. However, these sub-sea facilities have not been used as permanent production facilities because of their low availability and their unreliability. For example, in the case of pump failure the flow of production well fluid has to be secured for safety reasons during pump repair or replacement. In the case of electrical failure the flow of production well fluid has to be secured if there is insufficient storage volume available.

There is a need, therefore, for an improved technique for producing fluids from production wells which provides efficient production rates; allows separation of wellbore fluid components; is widely available; and is reliable enough for use as a permanent production facility. Moreover, there is a need for a technique which can be applied in a wide variety of environments, including land-based wells, sub-sea wells, wells in environmentally sensitive areas, and the like.

SUMMARY OF THE INVENTION

The present invention provides a novel technique for producing wellbore fluids. The technique utilizes a system for separating gas from liquid in production well fluid. The system includes a separation unit which is comprised of a storage tank able to store production well fluids, a first separation stage to separate gas from liquid, a second separation stage located in series with the first separation stage, and an electrical pumping system disposed in the storage tank to pump liquid out of the storage tank.

According to another aspect of the invention, a system is provided for producing fluids from a production well and for removing a portion of gas from production well fluids. The system is comprised of a plurality of separator units and a fluid transport system. Each separator unit includes a gas/liquid separation stage to separate a gas from a production well fluid, a storage tank for receiving at least a portion of the production well fluid, and a plurality of electric submergible pumping systems disposed in each storage tank to pump fluid from the storage tank. The fluid transport system is used to transport the production well fluid from a production well to the plurality of separator units.

According to another aspect of the invention, a method is provided for producing gas and liquid from a production fluid by separating at least a portion of the gas contained in the production fluid from the liquid contained in the production fluid. The method includes the steps of pumping a production fluid containing a gas and a liquid from at least one production well to at least one separator unit. The separator unit includes a plurality of gas/liquid separators, a submergible storage tank and a plurality of electric submergible pumping systems. The method further includes separating at least a portion of the gas from the production fluid through the use of the plurality of gas/liquid separators. The method further includes pumping the liquid stored from the submergible storage tank to a remote location and conveying the separated gas from the submergible storage tank.

BRIEF DESCRIPTION OF THE DRAWINGS

The invention will hereafter be described with reference to the accompanying drawings, wherein like reference numerals denote like elements.

DETAILED DESCRIPTION OF THE PREFERRED EMBODIMENTS

Figure 1:
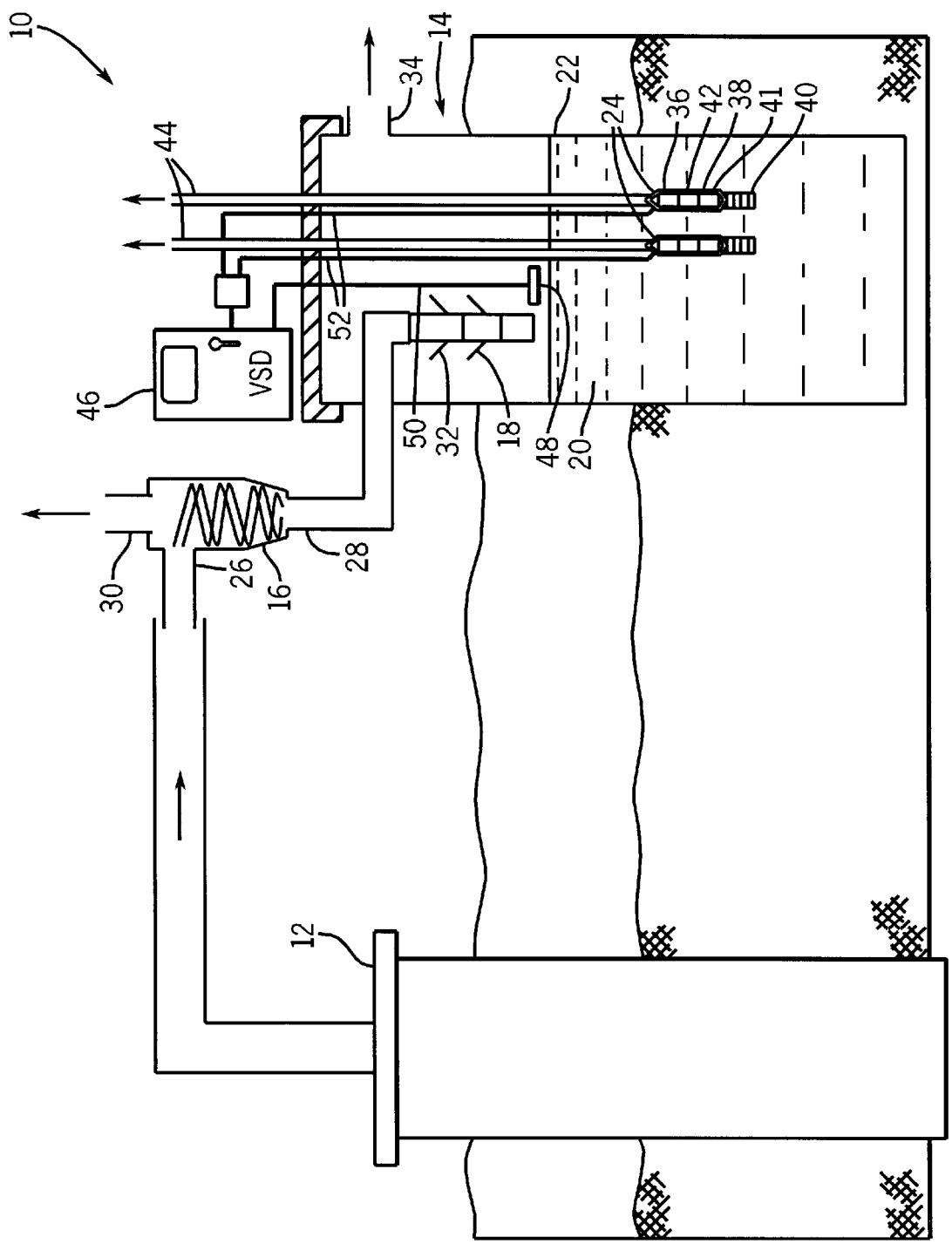
FIG. 1 is an elevational view of a separation unit, according to a preferred embodiment of the present invention.

Referring generally to FIG. 1, a system, designated generally by the reference numeral 10, is illustrated for producing and handling fluid of interest from one or more production wells 12. Fluids from the production wells 12 are raised from their collection point within the respective wells, and sent to a separation unit 14. It should be noted that, while in the present description reference is made to a production well sending production fluid to a single separation unit, in practice, a series of production wells may be included in the system, along with a plurality of separation units. Production may be continuous or intermittent from one or more of the production wells.

An exemplary separation unit 14 includes a first stage separator 16, a second stage separator 18, a third stage separator 20, a storage tank 22, and one or more electric submergible pumping (ESP) systems 24. Generally, separation unit 14 will include a plurality of ESP systems 22. As illustrated, production fluid enters the separator unit 14 through the first stage separator 16. First stage separator 16 includes a first stage fluid inlet 26, a first stage liquid outlet 28 and a first stage gas outlet 30. The first stage separator 16 may consist of any number of different gas and liquid separation devices: centrifugal separators, cyclone separators, and so forth. However, the preferred first stage separator 16 is a cyclone separator. Also, the first stage separator 16 may be located inside or outside the storage tank 22. In either case, first stage gas outlet 30 may be constructed to either vent the separated gas or direct the separated gas to the storage tank 22.

A second stage separator 18 may be utilized to serve as a second stage of gas and liquid separation. As illustrated, second stage separator 18 is disposed in the flow path of the fluid discharged from the first stage separator 16 through first stage liquid outlet 28. The second stage separator 18 may employ centrifugal separators, cyclone separators, deflector plates, and so forth to further reduce the concentration of gas in the fluid. Preferably, the second stage separator 18 utilizes a plurality of deflector plates 32 that interrupt the fluid flow to further separate gas components from liquid components. The separated gas from the second stage separator 18 may be vented or directed to the storage tank 22. The separated liquid from the second stage separator 18 is directed to the storage tank 22.

The storage tank 22 may serve several functions. The storage tank 22 may act as a storage volume for gas or liquid after separation and as an additional vehicle of gas and liquid separation. In the illustrated embodiment, the storage tank 22 serves both functions. The storage tank 22 stores separated liquid and gas received from the second stage separator 18 and functions as the third stage separator 20.

The storage tank 22 may be constructed in a variety of orientations and configurations. For example, the storage tank 22 may be prefabricated or formed from a wellbore adapted for use as a storage tank. Also, the tank 22 may be located below the surface, located above the surface, located on land, located subsea or at any combination thereof. As illustrated, the storage tank 22 is disposed partially above ground but primarily below ground.

The storage tank 22 acts as the third stage separator through the natural action of gravity and the differences in the specific gravities of the gas phase and liquid phase components of the production fluids. Gases, because of their lower specific gravity, will rise above the liquids in the storage tank 22 over time. Separated gas is removed from the top of the storage tank 22 through third stage gas outlet 34. The natural action of gravity may be enhanced by mechanical augmentation. It should also be noted that in the illustrated embodiment a single storage tank 22 is being used with a separator unit 14, however, a plurality of storage tanks 20 may be utilized with each separator unit 14.

In the illustrated embodiment, liquids in the storage tank 22 are removed by a plurality of ESP's 24. An ESP 24 is typically comprised of a submergible pump 36 having a fluid intake 38. Submergible pump is driven by a submergible motor 40 protected by a motor protector 41. An ESP 24 may, in addition, include an additional stage of gas and liquid separation by separating and removing a portion of any gas in the fluid flowing through the ESP. A rotary gas separator 42 is positioned between the submergible pump 36 and the fluid intake 38. Fluids drawn into the fluid intake 38 are processed within the rotary gas separator 42. The rotary gas separator 42 removes an additional portion of gas from the liquid if there is gas remaining in the liquid after the previous stages of gas and liquid separation. From the ESP 24, the gases are released into the storage tank 22 where, by virtue of the low specific gravity of gas, the gas will rise above the liquid in the storage tank 22. Alternatively, the gas may be directed out of the storage tank 22 to a desired location via a gas conduit (not shown). Rotary gas separator 42 may be comprised of any suitable type of separation device, such as centrifugal separators, cyclone separators, and so forth.

Preferably, a plurality of ESPs 24 are utilized in each storage tank 22 for a variety of reasons. One reason for using multiple ESPs is that this increases the reliability of the system. If one ESP fails another ESP can be started and operated in its place without the need to shutdown the system for repair or replacement. Alternatively, a plurality of ESPs allows for higher production rates when desired.

The height of an ESP 24 in the storage tank 22 may be fixed or adjustable to enable the ESP 24 to draw liquid from various points in the storage tank 22. The discharge of an ESP 24 is coupled through lengths of conduit 44, such as production tubing or coiled tubing, to an external system for transporting the liquid to its ultimate destination.

An ESP 24 receives power and control from drive circuitry. Where desired, the drive circuitry may vary the number of ESP's operating or control the speeds, and thus fluid flow rate, of the ESP's. The drive circuitry may be operated to provide a desired production rate, to maintain desired levels within either or both a production well 12 or within the storage tank 22. It may be desirable to maintain specific elevations of fluid within the storage tank 22 to accommodate fluctuations in production from the production wells or to provide desired residence times for the separation of gaseous and liquid phase components of the production fluids.

In the illustrated embodiment, a variable speed drive 46 is used as the drive circuitry to vary the speed of the ESP motors and, thus, the rate of fluid pumping. The particular form of the variable speed drive may vary, depending upon the type of electric motor employed in the ESP 24. However, any suitable variable speed drive may be used as drive circuitry, such as pulse width modulated AC drives, pulse width modulated DC drives, variable voltage drives, and so forth. The variable speed drive 46 receives input signals from a level sensor 48. A level sensor 48 may generally take the form of limit switches that convey signals to the variable speed drive 46 via one or more instrumentation conductors 50. In response to the signals provided by the level sensor 48, the variable speed drive 46 provides variable speed power to the ESP's 24 to maintain a desired liquid level in the storage tank 22. The variable speed drive 46 provides power to the ESP's through power cables 52.

As discussed above, where the production fluids include substantial quantities of gas, the foregoing technique permits the production fluids to be displaced in a rapid and efficient manner from the production wells, with the gas being separated later in the separation unit 14. For example, three production wells provided in such a system may produce different levels of oil and gas. Moreover, the particular gas to oil ratio of each production well may vary over time and there may be substantial variations between the levels of gas in the production fluids between the various wells. The production from each well is deposited in one or more separation units 14, where the gas is allowed or forced to separate from the liquid components. As a result, the ESPs 24 within a given separation unit 14 need only produce the liquid phase components and not the additional volume of gas. This aspect of the inventive system shows the ability to provide a pumping system in separation unit 14 that has a lower capacity than the total production capacity of the production wells.

It also should be noted that the foregoing structure permits increased production from the production wells by significantly reducing the head that must be overcome by pumping systems producing from production well 12. Specifically, the separation unit may be disposed relative to the production well 12 such that the pumping systems within the production well 12 need only raise the production fluids to the level of any transfer conduit between the production well 12 and the separation unit 14. Additional head required to force the production fluids to a final collection or processing location is provided by the ESPs 24 within the separation unit. This reduces the demands on the pumping systems in the production wells. This advantage is multiplied when there are multiple production wells supplying production fluid to the separation unit or units 14. It further should be noted that the production fluid produced from the separation unit 14 will be of a substantially lower gas to oil ratio, thereby further improving the efficiency of the ESPs when pumping.

The separation unit 14 also may include an integral compressor (not shown) for compressing and displacing separated gas. For example, gas stored in the storage tank 22 can be discharged through third stage gas outlet 34 to a compressor (not shown). The gas then can be compressed by the compressor and conveyed from the separation unit 14 via a length of conduit. The length of conduit conveying the compressed gas can run coaxially with the lengths of conduit 44 through which the liquid-phase components are discharged from the separation unit 14.

Figure 2:
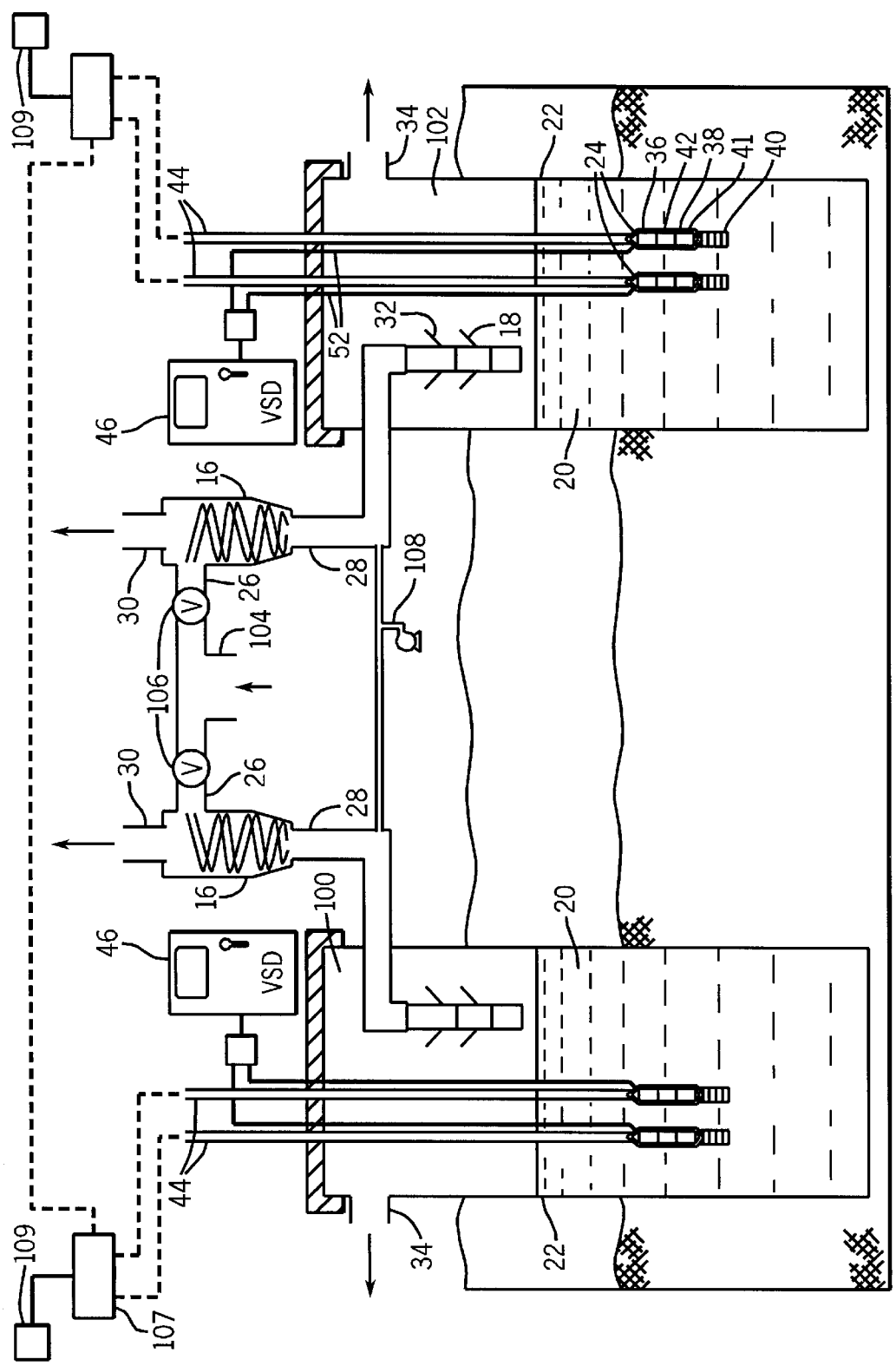
FIG. 2 is an elevational view of a system utilizing a plurality of separation units, according to a preferred embodiment of the present invention.

Referring generally to FIG. 2, a front elevational view is shown of a system for producing fluids from a plurality of production wells utilizing a first separation unit 100 and a second separation unit 102. Both first separation unit 100 and second separation unit 102 perform, generally, as per the description of separation unit 14 of FIG. 1. Elements of the embodiment shown in FIG. 2 that have like-numbered elements in FIG. 1 perform generally as described with respect to FIG. 1.

However, in this embodiment the production fluids from a plurality of production wells are delivered to the first separation unit 100 and the second separation unit 102 via a production manifold 104. Additionally, isolation valves 106 are included so that the first separation unit 100 and second separation unit 102 can be isolated from the production manifold 104. The isolation valves 106 permit the flow of production fluid to be secured to either the first separation unit 100 or the second separation unit 102 for servicing. The use of a plurality of separation units allows the production operations to continue during periods when flow must be secured to one or more of the separation units.

A fluid manifold 107 is included in the system to coordinate fluid removal from the system. The need may also arise for removing liquid from one storage tank and for placing it into another storage tank or another separation unit. Fluid manifold 107 contains the appropriate valves that allow the fluids to be directed from the ESP's to a number of locations: an external facility, another storage tank within the same separation unit, or another separation unit.

A variety of chemical agents may be needed in the system, such as anti-corrosion agents or anti-foaming agents. Therefore, in the illustrated embodiment a chemical injection system 108 is included. Chemical injection system 108 is used to inject desired chemical agents into the system.

Each separation unit 14 also may include cathodic protection to minimize corrosion. For example, sacrificial anodes (not shown) on the walls of the storage tank below the liquid level can provide cathodic protection to the storage tank from the corrosive effects of the liquids stored in the tank.

A control system 109 also is included to coordinate the operation of the system. The control system 109 controls the operation of the isolation valves 106 and the fluid manifold 107. The control system also can be configured to control the operation of the ESP's 24. The control of additional components may be included, as desired, as part of the control system 109.

Figure 3:
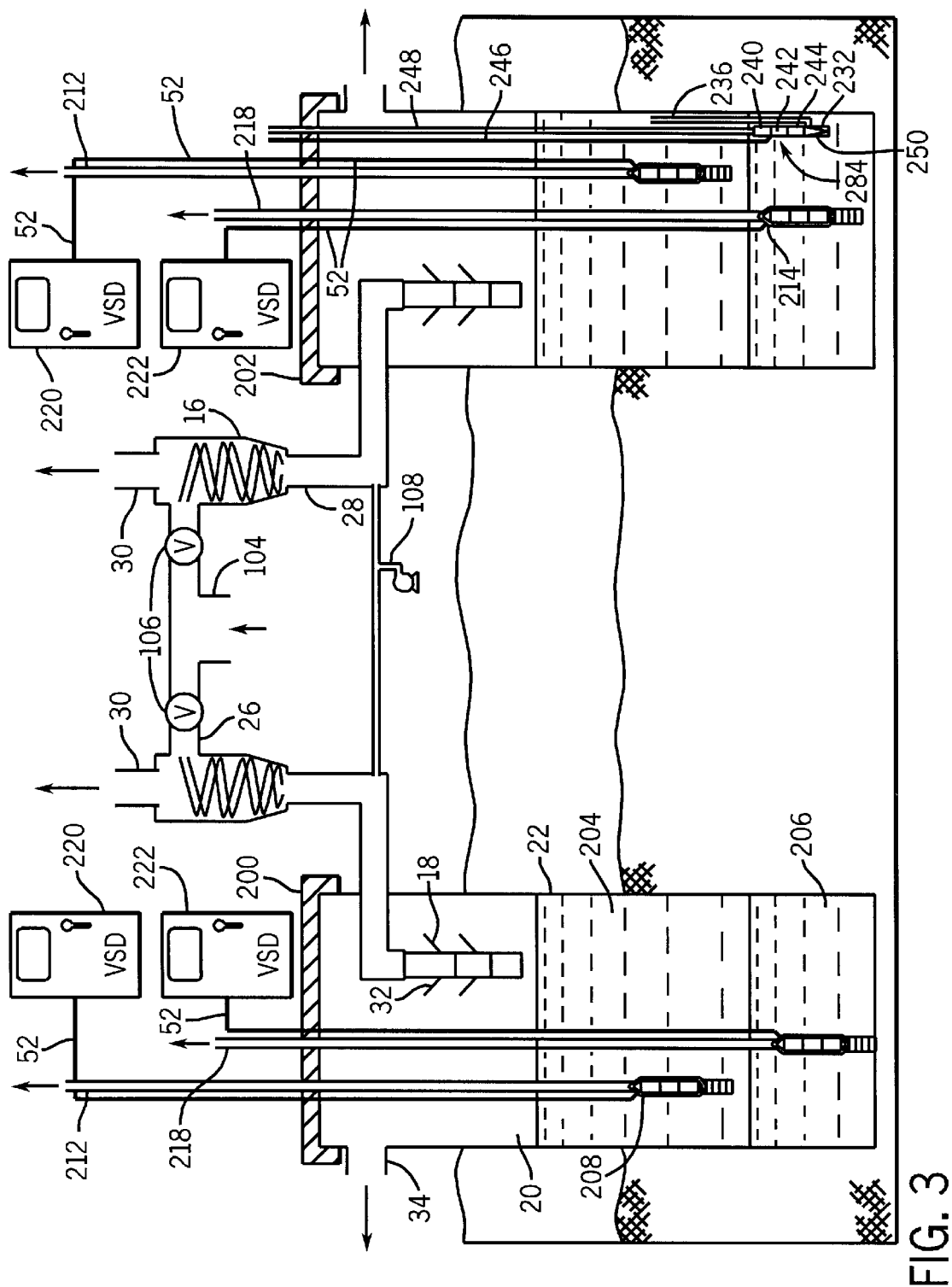
FIG. 3 is an elevational view of an alternate embodiment of the system illustrated in FIG. 2.

The fluid produced by a production well may contain, in addition to gas, liquids of different specific gravities, e.g., oil and water. Referring generally to FIG. 3, an elevational view is shown of a system utilizing a first separation unit 200 and a second separation unit 202 to separately produce gas and a plurality of liquids. First separation unit 200 and second separation unit 202 are two embodiments of a system for separating liquids within a storage tank 22. The separation units perform, generally, as per the embodiments shown in FIGS. 1 and 2. Elements of the embodiments shown in FIG. 3 perform as described with respect to corresponding like-numbered elements in FIGS. 1 and 2.

Over a period of time, a mixture of a lighter and a heavier liquid placed in a container will eventually stratify into a region of separated lighter liquid, a region of separated heavier liquid, and an interface region between the two liquids where a mixture of the two fluids remains. The size of the interface region will decrease over time as the two liquids more completely separate into their constituent liquids.

The first separation unit 200 is an example of a system that relies on the natural action of gravity to separate oil 204 from water 206 in a storage tank 22. An oil pumping ESP 208 can be positioned in the storage tank 22 so that oil pumping ESP intake draws in oil 204, rather than water 206. Oil pumping ESP 208 discharges the oil through a conduit 212. A water pumping ESP 214 can be positioned so that water pumping ESP draws in water 206, rather than oil 204. Water is discharged by water pumping ESP 214 through a conduit 218. The system also may include separate drive circuitry for the oil pumping ESP 208 and the water pumping ESP 214 along with respective level sensors (not shown) to maintain desired levels of separated liquids in the storage tank 22. In the illustrated embodiment, a first variable speed drive 220 is used to provide power to the oil pumping ESP 208. A second variable speed drive 222 is used to provide power to the water pumping ESP 214.

The natural action of gravity in separating liquids can be supplemented through the use of a liquid separator. The second separation unit 202 is an example of a system that supplements the natural action of gravity with a liquid separator system 230. A liquid separator can be used to decrease the amount of time necessary to separate a mixture into its various constituent liquids. As illustrated, a liquid separator system 230 is shown that includes a liquid separator 232, a pumping system 234, an oil discharge conduit 236 and a water discharge conduit 238. Liquid separator 232 can utilize a variety of liquid separation technologies, however, in this embodiment a hydrocyclone separator is preferred. A hydrocyclone separator uses centrifugal force to separate liquids of differing specific gravities. The pumping system 234 is comprised of a submergible electric motor 240, a motor protector 242, and a submergible pump 244. The system is supplied power by an electrical power cable 246. The system is supported in the storage tank 22 by a physical support 248, for example, a wireline, coiled tubing or other mechanism.

In operation, the liquid separator system 230 is positioned by the physical support 248 to draw in fluid from an interface region 250. The fluid in the interface region 250 is a mixture of oil and water. The pumping system 234 provides the motive force to pump the mixture of oil and water from the interface region 250 through the liquid separator 232. The hydrocyclone separator in the liquid separator 232 separates the oil and the water. Oil is discharged from the liquid separator 232 through an oil discharge conduit 236 that extends upward beyond the interface region 250. Conversely, water is discharged from the liquid separator 232 downward through a water discharge conduit 238. The conduits help establish distinct regions of separated oil 204 and separated water 206 by preventing the system from ingesting recently discharged separated oil 204 and separated water 206 rather than the desired mixture of oil and water from the interface region 250.

Various alternative arrangements may be envisaged for the foregoing structure and technique, particularly regarding the types of fluid displacement systems provided in the production wells and separation units. The systems utilized for lifting fluids from the production wells and for displacing the fluids from the separation units may take various forms, depending upon the locations of the wells, the well conditions, the types of fluids being produced, and so forth. Thus, while electric submergible pumping systems have been described, the production wells may raise fluids by any suitable means, including gas lift, sucker rod pumps, natural pressure, as well as via pumping systems incorporating centrifugal pumps, progressive cavity pumps, jet pumps, and so forth. These and other modifications may be made in the design and arrangement of the elements without departing from the scope of the invention as expressed in the appended claims.

What is claimed is:

1. A system for separating gas from liquid in production well fluid produced from a well, comprising:
    a separation unit including:
        a storage tank able to store a production well fluid;
        a first separation stage to separate gas from liquid;
        a second separation stage located in series with the first separation stage; and
        at least one electric submergible pumping system disposed in the storage tank to pump liquid out of the storage tank.

2. The system as recited in claim 1, wherein the first separation stage is disposed outside the storage tank.

3. The system as recited in claim 1, wherein the first separation stage is disposed within the storage tank.

4. The system as recited in claim 1, wherein the first separation stage comprises a cyclone separator.

5. The system as recited in claim 1, wherein the second separation stage comprises a gravity separator within the storage tank allowing production well fluid to undergo separation into constituent gases and liquids due to the combination of the force of gravity and the differences in the specific gravities of the fluids comprising the production fluid.

6. The system as recited in claim 4, wherein the second separation stage comprises a gravity separator within the storage tank allowing production well fluid to undergo separation into constituent gases and liquids due to the combination of the force of gravity and the differences in the specific gravities of the fluids comprising the production fluid.

7. The system as recited in claim 1, wherein the storage tank comprises a former production well.

8. The system as recited in claim 1, further comprising a sensor to detect a liquid level in the storage tank.

9. The system as recited in claim 8, wherein the sensor is coupled to a variable speed drive, the variable speed drive being coupled to the at least one electric submergible pumping system to regulate a rate of liquid displacement to maintain a desired liquid level in the storage tank.

10. The system as recited in claim 1, wherein in the at least one electric submergible pumping system comprises a plurality of electric submergible pumping systems in the storage tank.

11. The system as recited in claim 1, wherein the storage tank comprises a plurality of storage tanks and the at least one electric submergible pumping system comprises a plurality of electric submergible pumping system disposed in each storage tank.

12. The system as recited in claim 1, wherein the separation unit comprises a plurality of separation units.

13. A system for producing fluids from at least one production well and removing at least a portion of gas from production well fluids containing gas and liquid, the system comprising:
    a plurality of separator units, each separator unit including at least one gas/liquid separation stage to separate a gas from a production well fluid; a storage tank for receiving at least a portion of the production well fluid; and a plurality of electric submergible pumping systems disposed in each storage tank to pump fluid therefrom; and
    a fluid transport system to transport the production well fluid from at least one production well to the plurality of separator units.

14. The system as recited in claim 13, wherein the at least one gas/liquid separation stage of each separator unit is disposed within the storage tank.

15. The system as recited in claim 13, wherein the at least one gas/liquid separation stage of each separator unit is disposed external to the storage tank.

16. The system as recited in claim 13, further comprising a second separation stage.

17. The system as recited in claim 14, further comprising a second separation stage, wherein the first separation stage comprises a centrifugal separator and the second separation stage comprises a gravity separator.

18. The system as recited in claim 13, further comprising an isolation circuit to selectively isolate individual separator units.

19. The system as recited in claim 13, further comprising a second fluid transport system to transport the fluid from each storage tank in the plurality of separation units to a remote location or at least one other storage tank in the plurality of separation units.

20. The system as recited in claim 13, wherein the plurality of electric submergible pumping systems of at least one separator unit are utilized in pumping at least two different liquids.

21. The system as recited in claim 13, further comprising a chemical injection system to add chemicals into the system.

22. The system as recited in claim 13, wherein the system is primarily disposed at a subsea location.

23. A method for producing gas and liquid from a production fluid by separating at least a portion of the gas contained in the production fluid from the liquid contained in the production fluid, the method comprising the steps of:

pumping a production fluid containing a gas and a liquid from at least one production well to at least one separator unit, the separator unit including a plurality of gas/liquid separators, a submergible storage tank and at least one electric submergible pumping systems;

separating at least a portion of the gas from the production fluid through the use of the plurality of gas/liquid separators;

pumping the liquid from the submergible storage tank to a remote location; and conveying the separated gas from the submergible storage tank.

24. The method as recited in claim 23, further comprising deploying a plurality of electric submergible pumping systems in each submergible storage tank.

25. The method as recited in claim 24, further comprising utilizing a plurality of separator units and selectively controlling each electric submergible pumping system in each separator unit.

26. The method as recited in claim 23, further comprising separating the gas from the production fluid at two separate stages.

27. The method as recited in claim 26, wherein separating including separating by centrifugal force and separating by gravity.

28. A system for separating gas from liquid in production well fluid produced from a well, comprising:

a storage tank having an upper gas separation region and a lower liquid holding region;

a gas passage to permit release of a gas from the upper gas separation region; and at least one electric submergible pumping system to remove a liquid from the lower liquid holding region.

29. The system as recited in claim 28, further comprising a second storage tank and a second electric submersible pumping system disposed in the second storage tank.

30. The system as recited in claim 29, further comprising a manifold connecting the storage tank and the second storage tank.

31. The system as recited in claim 28, wherein the storage tank is disposed above ground.

32. The system as recited in claim 28, wherein the storage tank is disposed within the ground.

33. The system as recited in claim 28, wherein the storage tank is disposed at a subsea location.

* * * * *